Nov. 1, 1927.   1,647,671
J. W. STACK
VENTILATOR FOR LOCOMOTIVE CABS
Filed Nov. 29, 1926   2 Sheets-Sheet 1

Inventor
J. W. Stack
By Lacey & Lacey, Attorney.

Inventor
J. W. Stack
By Lacey & Lacey, Attorney

Patented Nov. 1, 1927.

1,647,671

UNITED STATES PATENT OFFICE.

JOHN W. STACK, OF SPRINGFIELD, MASSACHUSETTS.

VENTILATOR FOR LOCOMOTIVE CABS.

Application filed November 29, 1926. Serial No. 151,508.

The present invention is directed to improvements in ventilators for locomotive cabs.

The primary object of the invention is to provide a device of this character capable of being conveniently installed upon an engine cab in order that excessive warm air can be expelled from the cab, as well as obnoxious fumes and gases which enter the cab when passing through tunnels, thus adding greatly to the comfort of the occupant of the cab.

Another object of the invention is to provide a device of this character so constructed that steam from the locomotive boiler is utilized for operating the device.

Another object of the invention is to construct a device of this character in such manner that air in the cab will be drawn therefrom at various locations in order to assure effective ventilation and circulation within the cab.

Figure 1:
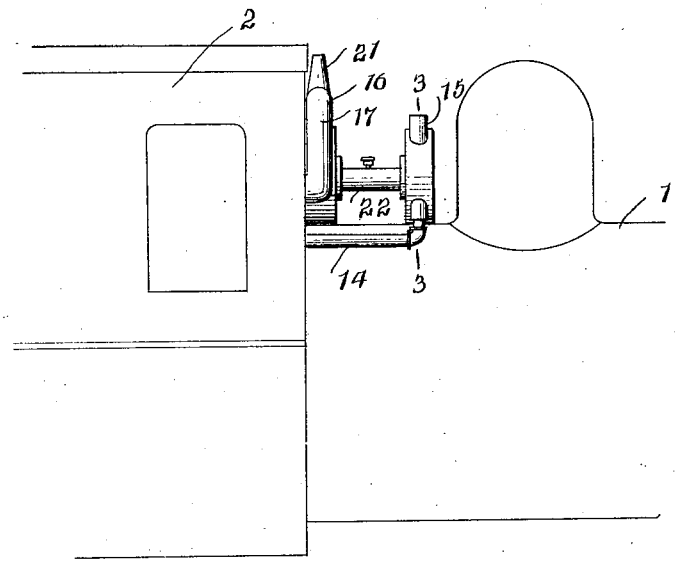
Figure 1 is a fragmentary side elevation of a locomotive, showing the device in place thereon.
Figure 2:
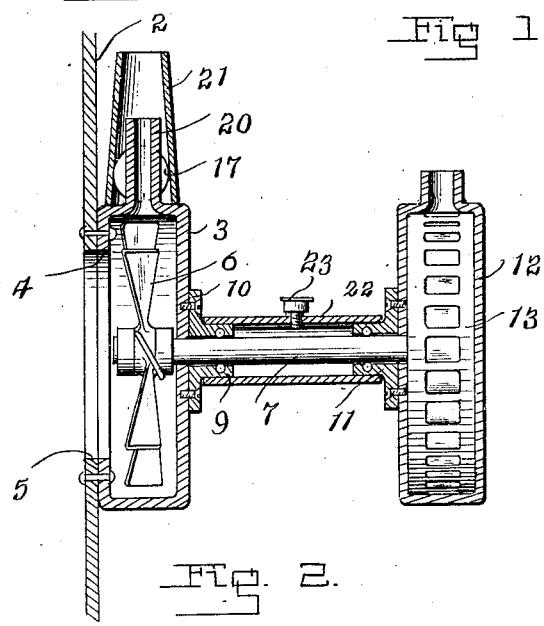
Figure 2 is a longitudinal sectional view through the device.
Figure 3:
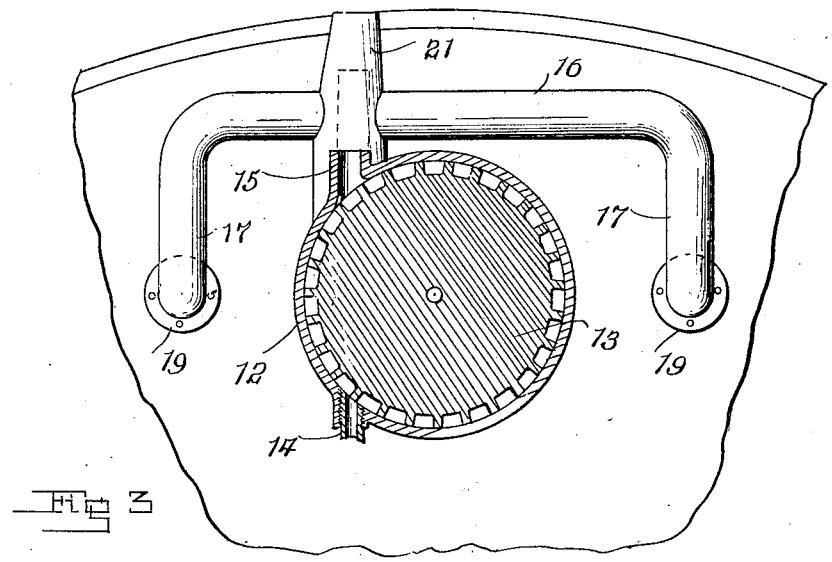
Figure 3 is a sectional view on line 3—3 of Figure 1.
Figure 4:
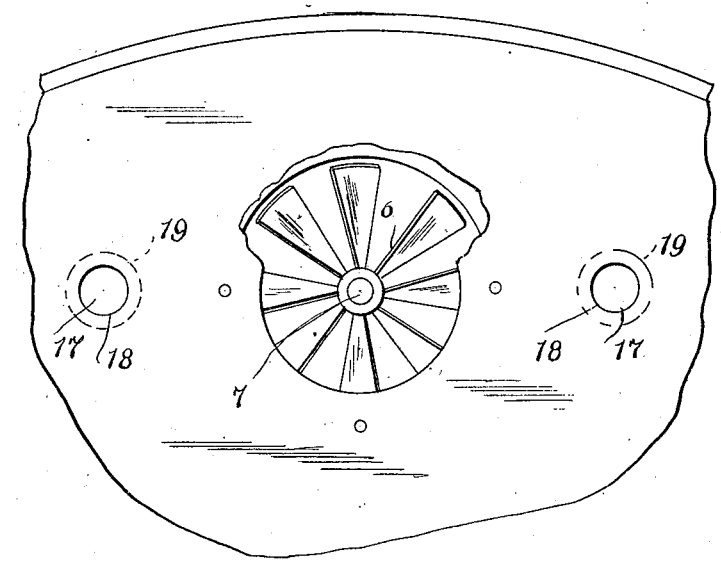
Figure 4 is a rear elevational view of the cab wall, partly broken away to show the relative arrangement of the fan and branches.

Referring to the drawings, the numeral 1 designates a locomotive boiler and 2 the cab thereon. The ventilator comprises a circular casing 3 having its rear wall provided with an opening 4 adapted to register with an opening 5 formed in the front wall of the cab in order that when the casing 3 is secured to the outside surface of the cab wall air from the cab can freely enter the casing through the openings 4 and 5.

A fan 6 is located in the casing 3 and is fixed upon the inner end of the shaft 7 which is journaled in the bearing 9 carried by the plate 10 which is fixed to the outer wall of said casing.

The outer end of the shaft 7 is journaled in a bearing 11, fixed to the rear wall of the casing 12 which is spaced from the casing 3. Located in the casing 12 and fixed to the terminal of the shaft 7 is a rotary piston 13, steam for rotating the piston being conducted from the locomotive boiler into the lower end of the casing 12 through the pipe 14. The steam entering the casing is exhausted through the nipple 15.

A manifold 16 is employed and extends transversely adjacent the front wall of the cab and has terminal branches 17 adapted to be placed in registration with openings 18 formed in the cab wall and upon opposite sides of the openings 4 and 5. The terminal branches are provided with flanges 19 secured to the cab wall and sustain the manifold in its operative position.

An injector nozzle 20 carried by the casing 3 enters the manifold and extends into the ejector nozzle 21 carried thereby, the purpose of which will appear later.

Extending between the bearings 9 and 11 and having its inner ends supported thereon is a protective sleeve 22, there being an oil cup 23 carried thereby to permit lubricant to be supplied to said bearings.

Briefly, the operation is as follows: The steam conducted to the casing 12 will rotate the piston therein, thus imparting rotary movement to the fan 6 through the medium of the shaft 7, whereby air is drawn from the cab into the casing 3 and is exhausted therefrom through the nozzle 20 into the injector nozzle 21. The flow of air from the nozzle 20 will create suction in the manifold, thus drawing air from the cab through the branch 17 into the manifold to be ejected from the nozzle 21. Any suitable valve may be used for controlling the flow of steam to the casing 12 in order to regulate the rotary speed of the piston, thereby governing the ventilation of the cab.

From the foregoing description it will be observed that the ventilator is formed in such manner that air will be drawn from the cab at three distinct points, thus assuring proper ventilation of the cab, and circulation of the air therein.

It will be of course understood that the ventilator can be used in connection with buildings or rooms, and is not necessarily limited for use in connection with the cabs of locomotives.

Having thus described the invention, I claim:

1. A ventilator for locomotive cabs comprising a casing having communication with the interior of the cab, a fan in the casing, a manifold having branches affording communication between the cab and manifold, an ejector or nozzle carried by the manifold, an injector nozzle carried by the casing and entering the manifold and extended into the ejector nozzle, and means for rotating the fan.

2. A ventilator for locomotive cabs comprising a casing having communication with the cab, a fan in the casing, a manifold having communication with the cab, an ejector nozzle carried by the manifold, an injector nozzle leading from the casing and extending into the ejector, and means for rotating the fan.

In testimony whereof I affix my signature.

JOHN W. STACK [L. S.]